Aug. 2, 1966 B. HELLSTRÖM 3,264,614

SYSTEM FOR AUTOMATIC ELECTRIC RECORDING AND INDICATING
A CODE MARKED BY MEANS OF PASSIVE
CIRCUIT ELEMENTS ON A VEHICLE

Filed Jan. 19, 1960 2 Sheets-Sheet 1

Inventor
Börge Hellström

BY

INVENTOR.
Borje Hellstrom
BY
Richard S. Sinker
Attorney

United States Patent Office 3,264,614

Patented August 2, 1966

3,264,614

SYSTEM FOR AUTOMATIC ELECTRIC RECORDING AND INDICATING A CODE MARKED BY MEANS OF PASSIVE CIRCUIT ELEMENTS ON A VEHICLE

Börje Hellström, 6 Svartviksvagen, Bromma, Stockholm, Sweden

Filed Jan. 19, 1960, Ser. No. 3,328
Claims priority, application Sweden, Jan. 21, 1959, 540/59
7 Claims. (Cl. 340—152)

The purpose of the invention is to facilitate an automatic generation and transmission of information in form of electric signals, corresponding to a code being marked on a moving vehicle, for instance a train, by means of a stationary code reproducing station, or vice versa, in order to provide, by means of the resulting signals, a recording of train number, destination or the like at a desired location.

Systems for this purpose are earlier known, in which the vehicle, for instance the car of a train, is provided with marking means comprising passive circuit elements for actuating a signal generation and code reproducing means arranged adjacent the path of motion of the vehicle. The expression "passive marking means" signifies, as used in this specification, a means, the essential function of which is to transfer a current generated by the signal generation and code reproducing means. It is known in the prior art for such purpose to arrange on the vehicle such passive marking means comprising circuit elements which may as desired be brought into a condition such as to actuate or not actuate a code reproducing means arranged adjacent the path of movement of the vehicle. The code reproducing means comprises an electric amplifier, a coil connected to the input circuit of said amplifier and a coil connected to the output circuit of the amplifier and which, if and when by means of the passive circuit elements of the vehicle marking means an inductive coupling between said coils supersedes a predetermined value, causes an oscillation having a frequency determined by a resonant circuit in the system. The input and output coils of the amplifier of the code reproducing means are thus so arranged relative to each other in space, that normally the inductive coupling between said coils does not give rise to the generation of an oscillation, representing a code signal pulse, in the code signal reproducing means. The vehicle-carried code marking means comprises a coil system which is arranged on the vehicle, so as to inductively cooperate with the coils of the code reproducing means when passed by the vehicle. By means of the coil system of the vehicle-carried code marking means when in an active position or switching state, an inductive coupling between the coils of the code reproducing means, which is sufficient and necessary for the generation of an oscillation in the amplifier circuit of said reproducing means, is obtained when the code marking means, arranged in proper location for cooperation with the coils of the code reproducing means, is passed by the vehicle, thus giving rise to a code signal pulse in said reproducing means.

The present invention relates to a system of the type described and a purpose thereof is to provide for a correct reading of information defined by a vehicle-carried code signal marking means by means of a stationary code reproducing means, or vice versa, irrespective of the velocity of the vehicle, which may be, for instance between 1 and 100 miles per hour, and irrespective of oscillation, rolling, rocking, pitching or bucking of the moving vehicle up and down and from side to side or otherwise.

A further purpose of the invention is to provide for a code signal reproducing system in an electric railway system which is "essentially insensitive to electric field interference or "static." The interference or static may be present over a wide frequency range, principally due to arcing in the current supply apparatus for the train. The code signal reproducing system can not be actuated erroneously by disturbing magnet fields surrounding said code reproducing means.

For said purposes a system of the kind described comprises, according to the invention, a code signal marking means, the coil system of which is switchable between two switching positions, in which different phase shifts are obtained for a current having the frequency determined by a frequency determining circuit in the system and being transmitted by said marking means from the output circuit of said code reproducing means to the input circuit thereof. The code reproducing means comprises two separate amplifier channels having such different phase shift for the fundamental frequency of said frequency determining circuit from the input circuit to the output circuit of said code reproducing means that an oscillation is generated in one and only said one of said two channels for a first position of said code marking means and in the second and only in said second amplifier channel for the second of said two positions of the code marking means.

By means of a system according to the invention a positive indication of two different positions of the vehicle carried code marking means can be obtained, bringing about advantages which are further illustrated in connection with an embodiment of the invention hereinafter described in greater detail below.

In order that the present invention may be readily carried into effect, it will now be described with reference to the accompanying drawings, wherein.

Figure 1:
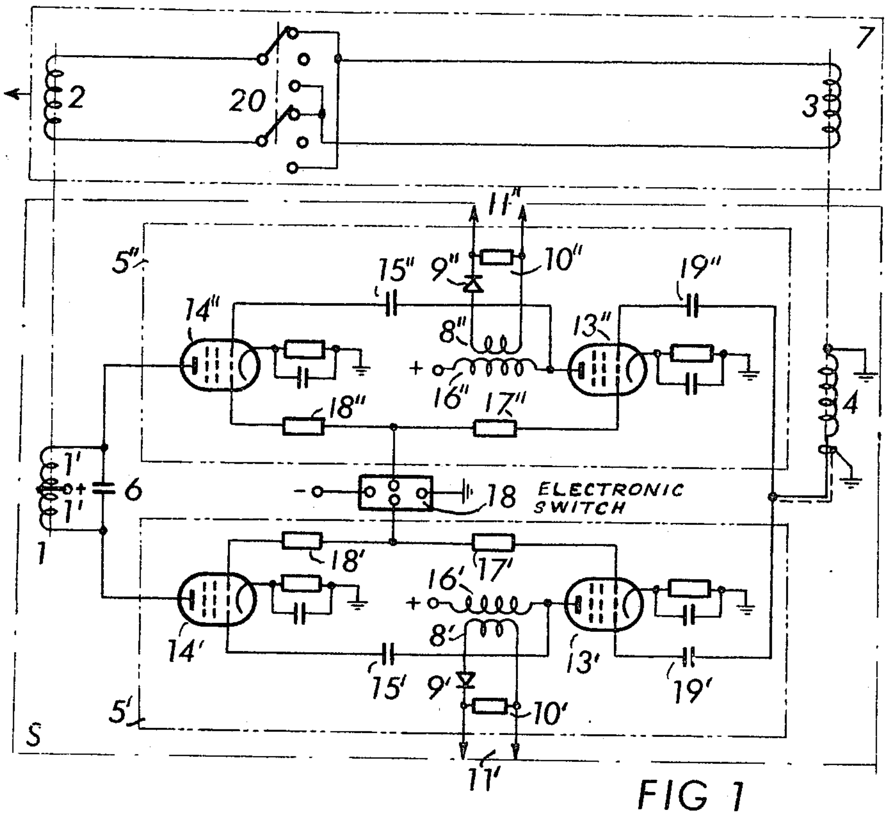
FIG. 1 is a circuit diagram illustrating, in principle, a stationary code reproducing means and a vehicle-carried code marking means passing the code reproducing means and at a moment at which it is in a position for causing generation of an oscillation in the system, said oscillation representing a code signal.

As illustrated in FIG. 1, a code reproducing and recording system of the type described comprises a stationary code reproducing means S having two stationary coils 1 and 4 constituting indication reading means of the system, said coils being arranged in the output and input circuits, respectively, of an amplifier means, comprising two amplifier channels 5' and 5''. Coils 1 and 4 are arranged adjacent the path of the vehicle, for example, a car of a train at a distance from each other which is such that the direct coupling between the coils is negligible or in any case so small that the code reproducing means does not function as a generator of oscillations without an additional inductive coupling between the coils. The additional coupling having a value and phase such that one of the amplifier channels of the amplifying means enters into a self-exciting oscillating state. Two coils 2 and 3, in the figure shown in FIG. 1 in a position in which an essential inductive coupling to corresponding coils of the code reproducing means is present, are arranged on the vehicle. The coils 2 and 3 are arranged at a distance from each other corresponding to the distance between the coils 1 and 4 of the reproducing means, so that an inductive coupling between coils 1 and 2 and coils 3 and 4 is simultaneously obtained as the vehicle passes the reproducing means. Coils 2 and 3 are connected to each other or connectable to each other by means of a throw-over switch 20 with a polarity corresponding to a relative phase shift of 180° in the current path via the code marking means from the output to the input circuit of the code reproducing means. Coils 2 and 3 and, as the case may be, the switch 20 together constitute the essential electrical circuit of a code marking means. The elements of the circuit and the distances between the coils of the system are so chosen that the coupling between coils 1 and 4 via the vehicle carried coils 2 and 3, if and when said last-mentioned coils are connected to each other by means of the switch 20, is such that one of the amplifier channels of the amplifying means functions as a generator of oscillations, the frequency of which is determined by a frequency determining circuit in the system. Such a frequency determining circuit, which in the embodiment illustrated in FIG. 1 is common to both amplifier channels is represented by coil 1 and a capacitor 6 connected in parallel therewith. An indication of the oscillation arising in either of the channels of the amplifier means is obtainable in a manner well known in the art.

The coils of the code reproducing means are so arranged that one of the amplifier channels oscillates if and when the input and output coils of the channel are inductively coupled to each other via a vehicle-carried coil system in which the coils are connected to each other with a predetermined polarity, while the second amplifier channel oscillates if and when the coils thereof are inductively coupled to each other via a vehicle-carried coil system, the coils of which are connected to each other with opposite polarity. Consequently, a coil, such as the input coil 4 of FIG. 1, common to the two amplifier channels 5′ and 5″ can be present in the input or output of the channels, while the other coils, such as the output coils of FIG. 1, are so polarized in relation to each other self-oscillation occurs only in one of the amplifier channels. In the circuit of FIG. 1, this result is achieved by arranging the output coils of the channel as a push-pull-coil having winding halves 1′ and 1″ connected to the outputs of the amplifier channels. With otherwise identical amplifier channels, this produces a difference in phase shift in the two channels of 180° between the input and output circuits of the channels.

The resonant circuit 1, 6 is so dimensioned that an oscillation frequency suitable for the purpose, for instance about 3 megacycles per second, is obtained. Each one of the amplifier channels 5′ and 5″ is, in FIG. 1, shown as comprising two amplifier tubes 13′ and 13″, 14′ and 14″ in cascade. The amplifier channels are provided with each one code signal indication circuit 8′, 9′, 10′ and 8″, 9″, 10″, respectively, with signal output leads 11′ and 11″, respectively. By means of coils 8′, 8″, respectively, the code signal indication circuits are coupled to anode coils 16′, 16″, respectively, in the anode circuits of the amplifier tubes 13′ and 13″, respectively. The indicating circuits are shown as comprising rectifiers 9′ and 9″, which produces a D.C. code signal voltage pulse at a resistor 10′, 10″, respectively when an oscillation occurs in the corresponding amplifier channel.

The two amplifier channels of the code reproducing means are connected to an electronic switching unit 18, by means of which the amplification is alternately reduced in one of the amplifier channels while, simultaneously, the amplification of the second amplifier channel is brought to a maximum, so that an oscillation can be generated in the channel having full amplification if and when the output and input coils are coupled to each other in proper phase via a code marking means. Without the electronic switching unit 18 the two channels would constitute a balanced amplifier system without self-exciting properties. The switching between the channels is provided at a frequency chosen with respect to the extension of the coils in the direction of movement and maximum velocity of the vehicle, so that each of the channels 5′ and 5″ is brought into circuit several times. As a limit, however, theoretically at least once for each passage of a vehicle, the switching frequency is preferably low compared with the frequency of an oscillation representing a code signal. The switching unit 18 may for instance comprise a generator delivering to the amplifier channels control voltages of square wave form which alternately brings the amplification in the two amplifier channels to cut-off, for instance 5000 times per second, by alternately varying a control voltage for the amplifier tubes in the channels between two levels, for instance 0 and −30 volts. The control voltages are, as illustrated in FIG. 1, applied, for example, to the amplifier tubes of the respective channels via resistors 17′, 17″ and 18′, 18″. Coil 4 is connected to control electrodes of tubes 13′ and 13″ via capacitors 19′, 19″, respectively.

The pulses provided by the code signal output circuits 11′ and 11″; respectively, of the code signal indication circuits 8′, 9′, 10′ and 8″, 9″, 10″ are utilized in a device which is not part of the present invention and which may be of a type well known in the art for converting a binary code into a desired recording or other control signal voltage. The code indication may also be provided by any obvious or known means other than that shown in FIG. 1.

FIG. 1 illustrates a code marking means comprising only one coil system with two coils 2 and 3. For automatic reading of a train number or for marking of a destination, it is, however, usually necessary to provide for the transfer of composite signals corresponding to at least two or three digit decimal numbers. Consequently the number of coil links on the vehicle must be chosen correspondingly, that is, instead of a marking means with only one coil link as shown in FIG. 1, a code marking means having a number of coil systems adapted to the necessary number of digits of a binary code are necessary.

Figure 2:
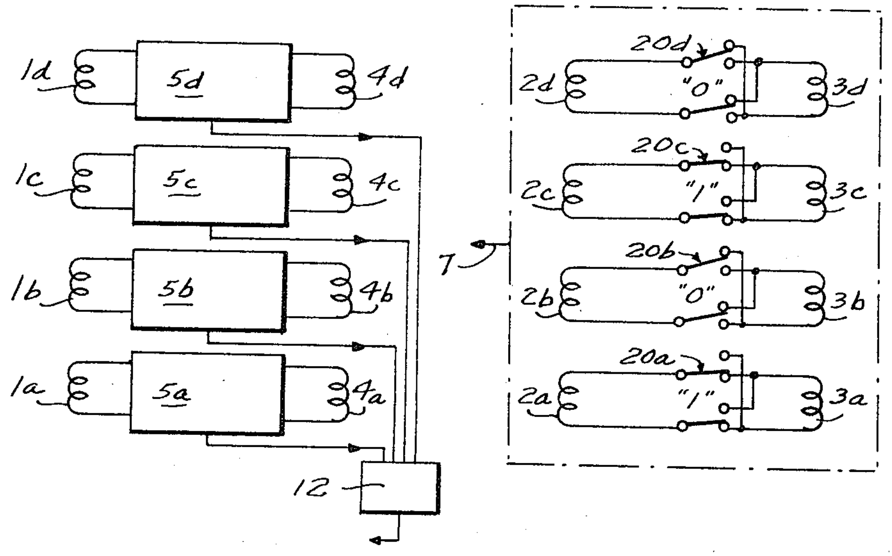
FIG. 2 is a circuit diagram which illustrates an embodiment comprising a code reproducing means comprising a plurality of code reproducing units and a marking means comprising a corresponding plurality of vehicle-carried code marking coil systems, each representing a marking unit.
Figure 3:
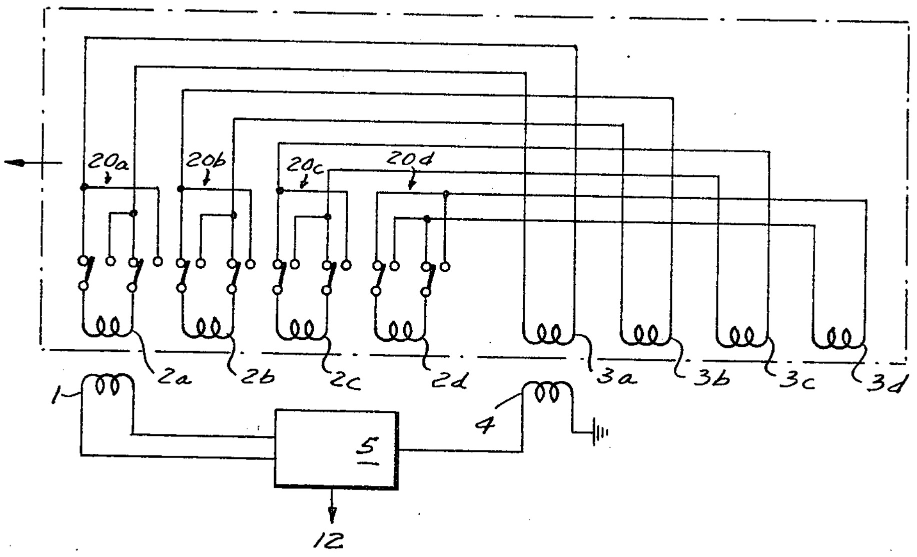
FIG. 3 is a circuit diagram which illustrates a system comprising a single code reproducing unit and a plurality of code marking units arranged after each other in the direction of movement of the vehicle.

A system for transferring a multi-digit code or mark is illustrated in FIGS. 2 and 3. As illustrated in FIG. 2, the coil systems of the code reproducing means and the code marking means, respectively, are so arranged relative each other that a simultaneous generation of code signals is obtained in all code reproducing units. In FIG. 2, a vehicle-carried code marking means 7 comprises, for example, four coil systems **7*a*–7*d* arranged above each other on the vehicle, so as to correspond to four stationary code reproducing units, comprising corresponding coil couples 1*a*, 4*a* to 1*d*, 4*d* and amplifying means 5*a*–5*d*, each comprising amplifying channels 5′, 5″ of the type described with reference to FIG. 1. Corresponding switching means 20*a*–20*d* on the vehicle may each be set to either of two different active positions to provide information in the form of a four digit binary code having active pulses corresponding to digit 0 as well as to digit 1 of the binary code. The coded information is transferred to the recording means 12 of the code reproducing means. In the recorder 12**, the received code information is converted into a signal representing the code information.

Although from certain points of view a simultaneous readout of a multi-digit code information principally is advantageous, the apparatus required for such readout is, due to the need for a plurality of stationary code reproducing units, rather elaborate. In the system of the present invention, a series readout of a group of indications may, however, be achieved at comparatively small cost. In principle, such readout may be obtained by means of a number of code marking coil units positioned one after the other in the path of travel of the vehicle, for instance as illustrated in FIG. 3.

In FIG. 3, four marking coil units *7a–7d* are arranged one after the other in the direction of movement of the vehicle. The reference numerals correspond to the ones used in FIG. 2 and the system thus comprises an amplifying means 5 having two amplifier channels, corresponding to the amplifier channels 5′, 5″ of FIG. 1, said channels providing a mutual phase shift of 180° between the input and output circuits of the channels for the frequency determined by the frequency determining circuit of the system. Due to the fact that an active indication is obtainable for each coil unit of the code marking means in dependence of its positioning, the arrangement avoids the disadvantages of devices in which one of the digits (1) of a binary number is indicated by the presence of a pulse, while the other digit (0) is indicated by absence of a signal (which for instance is detected by a time measuring means).

The function of the system of the present invention as illustrated in FIG. 1 is as follows:

Assuming that in the position of the switching means 20 shown in FIG. 1 the amplifier channel 5′ is excited during the switching period in which the channel is actuated by the switching means 18 to maximum amplification, the output circuit 1, 6 is excited by current in the lowermost part 1′ of the coil. Simultaneously, the amplifier path 5″ is brought to cut-off by the switching means 18 and, consequently does not transmit to the output circuit the high-frequency voltage produced at the input by the self-excited oscillations in channel 5′.

When, during the following switching period of the switching means 18, the amplifier channel 5′ is brought to cut-off and the amplifier channel 5″ is opened, no oscillations are generated because the amplifier channel 5″ cannot, when the switch 20 is in such position, excite the circuit in the proper phase for producing self-oscillation. During the periods of the switching voltage of the switching means 18, in which amplifier channel 5′ is open and thus a high frequency oscillation excited in this channel, an integrated D.C. voltage pulse appears at resistance 10′ as an indication of the fact that a passing code marking coil unit is set to an active position in which said unit has its coils connected to each other with a polarity representing for instance the digit 0 in a binary code system.

With switch 20 in its position opposite that shown in FIG. 1 the amplifier channel 5′ will remain inactive, the phase shift in the system then being such that oscillations are generated only when amplifier channel 5″ is opened by the switching means 18. Analogously, a code indication signal is obtained, at resistance 10″, which signal represents the digit 1 in the binary code system.

If the switch 20 is in an intermediate position in which coils 2 and 3 are disconnected no oscillations can arise in either of the amplifier channels, the code marking means thus being inactivated.

Figure 4:
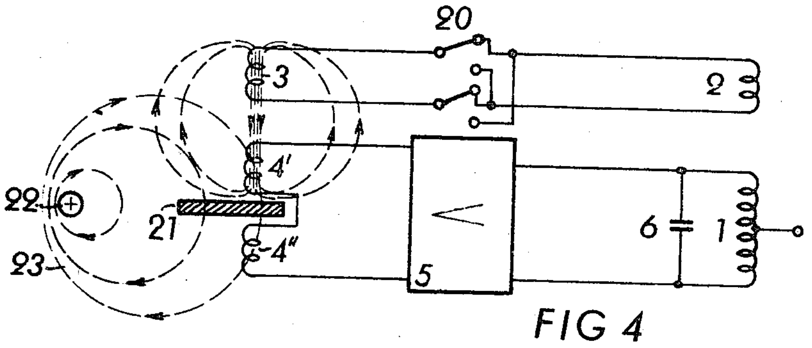
FIG. 4 illustrates apparatus for eliminating interfering external fields in a system according to the invention.

Normally a system of the type described is very insensitive to external interference fields. Nevertheless it may be preferable or necessary in some cases to reduce the influence of such interference. For this purpose, it is preferable to provide static screening of the coils of the system, for instance by means of grounding wire grids or slotted metal covers. Furthermore, interference field compensation is preferably provided in combination with the input circuit of the code reproducing means in order to diminish the influence of such interfering fields. An embodiment of an interference field compensation arrangement is illustrated in FIG. 4. The input coil of the code reproducing means is subdivided into two coil halves 4′ and 4″ wound in opposite directions and a magnetic ferrite plate 21 for corresponding screening means positioned between said coil halves. The field of coil 3 of a code marking means will then produce an E.M.F. in coil 4′ but not in coil 4″ due to the fact that the ferrite plate 21 prevents the field of coil 3 from reaching coil 4″. An interference field 23 from a remote source, for instance a current carrying conductor 22, which could, without the compensation means, under circumstances cause an erroneous indication by current through the amplifier means 5, induces counteracting voltages in the input coils 4′ and 4″.

The coils of the code marking means may, in principle, have any convenient shape, but in order to obtain increased assurance of a correct readout of a multi-digit code in accordance with the invention, the design of the coils should be such as to provide the maximum possible coupling between the coils of the code marking means and the coils of the code reproducing means and should be such as to prevent undue variation of the maximum coupling between the coils due to vertical displacement, to which the vehicle-carried coils may be subjected when arranged on a railway car. In a system in which the coils of coil units in the code marking means are displaced relative to each other in the direction of movement of the vehicle, the linking coils are preferably comparatively high as long and narrow, for instance rectangular, and the stationary coils of the code reproducing means are preferably, lower or shorter, for instance square or circular, with a width or an extension in the direction of movement the same as the width of the coils of the code marking means, or less.

If the coils of the code marking means, as is often the case, are to be placed adjacent plates or other structural members of iron or other material having high alternating current losses, it is essential, for retaining the sensitivity of the system, to prevent the A.C. field from entering such material and thereby decreasing the Q-value of the system circuit. For this purpose, a screen having high conductivity or a screening wall, consisting of, for instance, magnetic ferrite material of high permeability and low high frequency losses, may be positioned between the coils of the code marking means and the ferrite material, to eliminate the influence of said ferrite material on the coils. Preferably, both methods are combined, for instance by placing a ferrite plate adjacent the coil and placing as a supporting and screening rear wall, a plate of material having good conductivity, for instance aluminium, behind the ferrite plate. The ferrite plate then also increases the coupling between the coils of the code marking and code reproducing means, thus also increasing the sensitivity of the system.

The coil units of the code marking means may be switched in any of several ways obvious to anybody skilled in the art. Generally, however, the resistive losses in the connection leads between the coils and the contact resistances of the polarity switching means should be low. Control means for switching all of the vehicle carried code marking coil units may, if desired, be positioned comparatively remote from the coils, if only the capacitances of the connection leads are of low value. In order to increase the sensitivity of the system, it is desirable that the coil systems be designed to transfer large circulating currents in the code marking coil units and that the coils have a comparatively small number of turns. In such case, even comparatively high value capacitances of the connection leads can be tolerated. When the fundamental frequency of the oscillator circuit 1, 6 of FIG. 1, is for example, 2.8 megacycles per second, capacitances of the order 500 micromicrofarads are acceptable. The proper design of the coils provides a resonant frequency in the coils which is sufficiently different from the fundamental frequency of the system so that it does not adversely influence the electrical properties of the system.

If the code marking coil units are positioned far from the switching control means, remote controlled coil polarity changing switches may be utilized. Such switches may comprise, for instance, relays or other remote control switches or remote control gates, for instance transistors, or the like.

I claim:

1. A system for conveying a binary coded information from a first station to a second station, one of said stations being movable along a predetermined path of travel and the other of said stations being stationary adjacent to said path of travel, comprising, in combination, code signal determining means at said first station and code reading means at said second station, said code reading means at said second station including input inductance coil means and output inductance coil means and electrical signal amplifying means connected between said input coil means and said output coil means, said input coil means and said output coil means being spaced from each other a distance sufficient to prevent mutual inductive coupling between them and to thereby prevent electrical self-oscillation in said electrical signal amplifying means, said electrical signal amplifying means comprising two separate amplifier channels connected between said input coil means and said output coil means and a resonant circuit being common to both said amplifier channels and being tuned to a predetermined frequency, each of said amplifier channels being adapted to impart a phase shift different from that imparted by the other of said amplifier channels to a signal of said predetermined frequency transferred through the respective amplifier channel from said input coil to said output coil, said code signal determining means at said first station including for each binary digit of binary coded information to be conveyed an inductance coil system comprising a first inductance coil and a second inductance coil and switching means for mutually interconnecting said first and second inductance coils, said first and second inductance coils being spaced from each other a distance substantially equal to the distance between said input and output coil means of said code reading means and so disposed as to be inductively coupled to said output coil means and said input coil means, respectively, when said first station and second station are moved into operative proximity with each other, said inductance coil system forming thereby a signal feed-back path from said output coil means to said input coil means of said code reading means, said switching means being operable between a first position, in which said first and second inductance coils are interconnected with a first relative polarity so that said inductance coil system imparts a first predetermined phase shift to a signal of said predetermined frequency transferred through said inductance coil system from said output coil means to said input coil means of said code reading means, said first phase shift being related to the phase shift of the one of said two amplifier channels in said code reading means so as to create a positive feedback for said one amplifier channel and thereby electrical self-oscillation in said one amplifier channel, and a second position, in which said first and second inductance coils are interconnected with a second relative polarity so that said inductance coil system imparts a second predetermined phase shift to a signal of said predetermined frequency transferred through said inductance coil system from said output coil means to said input coil means of said code reading means, said second phase shift being related to the phase shift of the other one of said two amplifier channels of said code reading means so as to create a positive feedback for said other amplifier channel and thereby an electrical self-oscillation in said other amplifier channel.

2. A system as claimed in claim 1, wherein said code signal determining means comprise a plurality of inductance coil systems each including a first inductance coil and a second inductance coil and switching means for mutually interconnecting said first and second inductance coils of the particular system, said inductance coil systems being arranged in substantially linear relationship as a series one after the other in the direction of said path of travel.

3. A system as claimed in claim 2, wherein said first inductance coils of all said inductance coil systems are disposed in a row one after another in a predetermined sequence and said second inductance coils of all said inductance coil systems are disposed in a row one after another in the same sequence.

4. A system as claimed in claim 1, wherein the one of said input coil and output coil means in said code reading means is connected in common to said two amplifier channels and the other one of said input coil and output coil means is connected in polarity opposition to each of said amplifier channels.

5. A system as claimed in claim 4, wherein said one coil means connected in common to said two amplifier channels has two halves wound in directions opposite to each other and screening means arranged between said two halves.

6. A system as claimed in claim 1, wherein said code reading means comprise means for applying periodically varying amplification controlling bias voltages to each of said two amplifier channels for alternately varying the amplification of each amplifier channel between a low amplification value preventing electrical self-oscillation in that particular amplifier channel and a high amplification value permitting electrical self-oscillation in said amplifier channel, said bias voltages applied to said two separate amplifier channels being in phase opposition so that the amplification of the one amplifier channel has said low amplification value when the amplification of the other amplifier channel has said high amplification value and vice versa, the periodicity of said bias voltages being low compared with said predetermined frequency.

7. A system as claimed in claim 6, wherein said bias voltages are square wave voltages.

References Cited by the Examiner

UNITED STATES PATENTS

| | | | |
|---|---|---|---|
| 1,774,787 | 9/1930 | Clifford | 340—33 |
| 1,955,371 | 4/1934 | Springfield | 340—33 |
| 2,122,358 | 6/1938 | Preston | 246—2 |
| 2,203,871 | 6/1940 | Koch | 340—33 |
| 2,511,819 | 6/1950 | Wannamaker | 331—56 |
| 2,910,579 | 10/1959 | Jones et al. | 340—152 |
| 2,930,888 | 3/1960 | Crawford | 340—23 |
| 2,941,069 | 6/1960 | Duteil | 331—65 |

NEIL C. READ, *Primary Examiner.*

BENNETT MILLER, ELI SAX, *Examiners.*

W. K. TAYLOR, P. XIARHOS, A. WARING, *Assistant Examiners.*